United States Patent
Huang et al.

(10) Patent No.: US 10,341,003 B2
(45) Date of Patent: Jul. 2, 2019

(54) PRECODING METHOD, INFORMATION SENDING METHOD, AND APPARATUSES THEREOF

(71) Applicant: Beijing Zhigu Rui Tuo Tech Co., Ltd., Beijing (CN)

(72) Inventors: Weicai Huang, Beijing (CN); Yafei Tian, Beijing (CN); Chenyang Yang, Beijing (CN); Yifan Xue, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/382,619

(22) Filed: Dec. 17, 2016

(65) Prior Publication Data

US 2017/0195032 A1 Jul. 6, 2017

(30) Foreign Application Priority Data

Dec. 31, 2015 (CN) .......................... 2015 1 1029528

(51) Int. Cl.
*H04B 7/06* (2006.01)
*H04L 5/00* (2006.01)

(52) U.S. Cl.
CPC ......... *H04B 7/0639* (2013.01); *H04B 7/0626* (2013.01); *H04L 5/0032* (2013.01); *H04L 5/0048* (2013.01)

(58) Field of Classification Search
CPC .. H04B 7/0626; H04B 7/0639; H04B 7/0456; H04B 7/0469; H04B 7/0617; H04B 7/10; H04B 7/002; H04B 7/0413; H04B 7/0417; H04B 7/0478; H04B 7/0486; H04B 7/063; H04B 7/0632; H04B 7/0634; H04B 7/0691; H04L 5/0032; H04L 5/0048; H04L 2025/03808; H04L 1/0026; H04L 1/0027; H04L 1/0028; H04L 2025/03426;

(Continued)

(56) References Cited

U.S. PATENT DOCUMENTS

2009/0325496 A1* 12/2009 Ohm .................... H04B 7/0452
455/63.1
2011/0045782 A1* 2/2011 Shin .................... H04B 7/0417
455/67.13

(Continued)

FOREIGN PATENT DOCUMENTS

CN 102546123 A 7/2012
CN 102882570 A 1/2013

(Continued)

*Primary Examiner* — Nathan S Taylor
(74) *Attorney, Agent, or Firm* — Sheppard Mullin Richter & Hampton LLP

(57) ABSTRACT

Embodiments of the present application disclose a precoding method, an information sending method, and apparatuses thereof. The precoding method comprises: acquiring first information associated with a receiving matrix of at least one user equipment associated with a base station; and determining a first transmitting precoding matrix of the base station according to at least the receiving matrix of the at least one user equipment. According to the methods and apparatuses in the embodiments of the present application, a transmitting precoding matrix of a base station is designed according to a receiving matrix of a user equipment, which can reduce inter-cell interference.

27 Claims, 5 Drawing Sheets

(58) Field of Classification Search
CPC ............. H04L 25/0224; H04L 25/0248; H04L 25/03343; H04L 25/03898; H04L 25/03961; H04L 5/001; H04L 5/0023; H04L 5/0053; H04L 5/0057; H04L 5/006; H04W 72/0486; H04W 72/0413; H04W 48/08; H04W 72/00; H04W 72/0446
USPC ........................................................ 455/434
See application file for complete search history.

(56) References Cited

U.S. PATENT DOCUMENTS

| | | | | |
|---|---|---|---|---|
| 2011/0080961 A1* | 4/2011 | Hui | ........................ | H04B 7/024 375/259 |
| 2011/0222615 A1 | 9/2011 | Kuo et al. | | |
| 2011/0243017 A1* | 10/2011 | Prasad | ................ | H04W 72/085 370/252 |
| 2011/0249665 A1* | 10/2011 | Seyama | .............. | H04L 27/2646 370/350 |
| 2011/0261894 A1* | 10/2011 | Yu | ........................ | H04B 7/0413 375/267 |
| 2012/0076023 A1* | 3/2012 | Ko | ........................ | H04B 7/0486 370/252 |
| 2012/0076028 A1* | 3/2012 | Ko | ........................ | H04L 1/0026 370/252 |
| 2012/0275411 A1* | 11/2012 | Kim | ........................ | H04L 5/0032 370/329 |
| 2014/0010318 A1* | 1/2014 | Kim | ........................ | H04B 7/0639 375/267 |
| 2014/0140235 A1* | 5/2014 | Park | ........................ | H04W 52/244 370/252 |
| 2015/0229371 A1* | 8/2015 | Kim | ........................ | H04B 7/0469 375/267 |
| 2015/0244433 A1* | 8/2015 | Jindal | ................... | H04B 7/0413 370/329 |
| 2015/0372732 A1* | 12/2015 | Kim | ......................... | H04B 7/04 375/267 |
| 2016/0065279 A1* | 3/2016 | Wang | ..................... | H04L 5/0048 375/267 |
| 2016/0156397 A1* | 6/2016 | Onggosanusi | ....... | H04B 7/0456 370/252 |
| 2017/0195020 A1* | 7/2017 | Ko | ........................ | H04B 7/0456 |
| 2017/0195032 A1* | 7/2017 | Huang | ................. | H04B 7/0639 |
| 2017/0244513 A1* | 8/2017 | Pitakdumrongkija | ........................ H04L 1/0003 | |
| 2018/0234134 A1* | 8/2018 | Tang | ........................ | H04B 7/024 |

FOREIGN PATENT DOCUMENTS

| | | |
|---|---|---|
| CN | 103119859 A | 5/2013 |
| CN | 103209051 A | 7/2013 |
| CN | 103326819 A | 9/2013 |

* cited by examiner

PRECODING METHOD, INFORMATION SENDING METHOD, AND APPARATUSES THEREOF

CROSS REFERENCE TO RELATED APPLICATION

The present application is based on and claims the benefit of priority to Chinese Application No. 201511029528.2, filed on Dec. 31, 2015, the entire contents of which are incorporated herein by reference.

TECHNICAL FIELD

The present application relates to the wireless communications technologies field, and in particular, to a precoding method, an information sending method, and apparatuses thereof.

BACKGROUND

An MIMO (Multiple-Input Multiple-Output, Multiple-Input Multiple-Output) technology means that multiple transmit antennas and multiple receive antennas are used at a transmit end and a receive end respectively to cause that signals are transmitted and received by multiple antennas at the transmit end and the receive end, so as to improve communication quality. The MIMO technology can make full use of space resources and implement multiple-transmitting multiple-receiving by using multiple antennas, and can multiply a system channel capacity without increasing frequency spectrum resources and antenna transmit power, showing distinct advantages. Therefore, the MIMO technology is expected to be a core technology of next generation mobile communications.

An precoding (precoding) technology is a signal processing technology that is used to perform preprocessing on sending signals by using channel status information at a transmit end and aims at improving a system capacity and reducing a bit error ratio.

Ultra dense networks are considered to be a main evolution direction of the fifth generation mobile communications system. The ultra dense networks can maximally reuse frequency spectrum resources, and thereby provide a higher communication data rate for more users. However, severe inter-cell interference exists in a ultra dense network, and if not suppressed effectively, may seriously limit improvement of frequency spectrum efficiency and energy efficiency of a cellular system.

A proper design of a transmit end precoding matrix helps to make use of advantages brought by the multi-antenna technology and reduce inter-cell interference.

SUMMARY

In view of this, an objective of embodiments of the present application is to provide a new precoding scheme.

To achieve the foregoing objective, according to a first aspect of the embodiments of the present application, a precoding method is provided, where the method comprises:

acquiring first information associated with a receiving matrix of at least one user equipment associated with a base station; and determining a first transmitting precoding matrix of the base station according to at least the receiving matrix of the at least one user equipment.

According to a second aspect of the embodiments of the present application, an information sending method is provided, where the method comprises:

determining a receiving matrix of a user equipment; and sending first information associated with the receiving matrix of the user equipment, where the receiving matrix is used to determine a first transmitting precoding matrix of at least one base station associated with the user equipment.

According to a third aspect of the present application, a precoding apparatus is provided, where the apparatus comprises:

a first acquisition module, configured to acquire first information associated with a receiving matrix of at least one user equipment associated with a base station; and a first determining module, configured to determine a first transmitting precoding matrix of the base station according to at least the receiving matrix of the at least one user equipment.

According to a fourth aspect of the present application, an information sending apparatus is provided, where the apparatus comprises:

a fourth determining module, configured to determine a receiving matrix of a user equipment; and a second sending module, configured to send first information associated with the receiving matrix of the user equipment, where the receiving matrix is used to determine a first transmitting precoding matrix of at least one base station associated with the user equipment.

According to a fifth aspect of the present application, a precoding apparatus is provided, where the apparatus comprises:

a memory, configured to store instructions; and a processor, configured to execute the instructions stored in the memory, where the instructions cause the processor to perform the following steps:

acquiring first information associated with a receiving matrix of at least one user equipment associated with a base station; and determining a first transmitting precoding matrix of the base station according to at least the receiving matrix of the at least one user equipment.

According to a sixth aspect of the present application, an information sending apparatus is provided, where the apparatus comprises:

a memory, configured to store instructions; and a processor, configured to execute the instructions stored in the memory, where the instructions cause the processor to perform the following steps:

determining a receiving matrix of a user equipment; and sending first information associated with the receiving matrix of the user equipment, where the receiving matrix is used to determine a first transmitting precoding matrix of at least one base station associated with the user equipment.

According to the methods and apparatuses in the embodiments of the present application, a transmitting precoding matrix of a base station is designed according to a receiving matrix of a user equipment, which can reduce inter-cell interference.

DETAILED DESCRIPTION

Specific implementations of the present invention are described in further detail below with reference to the accompanying drawings and embodiments. The following embodiments are intended to describe the present invention, but not to limit the scope of the present invention.

A person skilled in the art can understand that, terms such as "first" and "second" in the present application are used only to differentiate different devices, modules, or parameters, and do not represent any particular technical meaning, nor indicate a necessary logical sequence among them.

The solutions in the embodiments of the present application may be used in various networks/systems, comprising, but are not limited to, a Code Division Multiple Access (CDMA) network, a Time Division Multiple Access (TDMA) network, a Frequency Division Multiple Access (FDMA) network, an Orthogonal FDMA (OFDMA) network, and a Single-carrier FDMA (SC-FDMA) network. The terms "system" and "network" can generally be used interchangeably. For clarity, an LTE (Long Term Evolution, Long Term Evolution) system is mostly used as an example in the following descriptions of the embodiments of the present application to describe some aspects of technical solutions of the present application, and LTE-A technical terms are used in most descriptions below, but this does not mean that the technical solutions in the embodiments of the present application are limited to an LTE application scenario. A "base station" generally means a random node, at a network end, that communicates with a user equipment (UE), such as a Node B, an eNode B, a base station, and an access point (AP). A micro base station comprises one or more of the following: a pico base station, a femto base station, a relay base station, a remote radio head (RRH) base station, or the like. The "macro base station" and "micro base station" are generally opposite in meaning, where a macro base station is any appropriate base station whose coverage is larger than that of a micro base station.

In addition, in the technical solutions in the embodiments of the present application, locations of a base station and a user equipment may distribute randomly, and both the base station and the user equipment can be configured with any quantity of antennas.

Figure 1A:
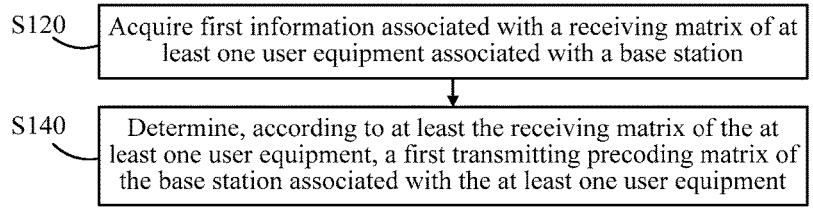
FIG. 1(a) is a flowchart of an example of a precoding method according to an embodiment of the present application.

FIG. 1(a) is a flowchart of an example of a precoding method according to an embodiment of the present application. The method can be executed by any base station (comprising a macro base station and a micro base station), or executed by an independent apparatus. As shown in FIG. 1(a), the method comprises:

S120. Acquire first information associated with a receiving matrix of at least one user equipment associated with a base station.

S140. Determine a first transmitting precoding matrix of the base station according to at least the receiving matrix of the at least one user equipment.

According to the method in this embodiment, a transmitting precoding matrix, also referred to as a first transmitting precoding matrix, of a base station is designed based on a purpose of reducing interference caused by the base station to a user that may be interfered by the base station. The first transmitting precoding matrix means a downstream transmitting precoding matrix that is used by the base station when transmitting a downstream signal to a user equipment served by the base station. In the method in this embodiment, a base station for which a transmitting precoding matrix is determined (also referred to as a target base station or an interfering base station below) may be any base station. At least one user equipment associated with the base station is a user equipment that may be interfered by the base station, that is, when receiving an expected signal sent by a served-cell base station of the at least one associated user equipment, the user equipment is interfered by a signal (also referred to as an interfering signal) sent by the target base station. The at least one associated user equipment may be determined according to a relative position of each user equipment relative to the target base station and an allocation status of used resources. For example, when resources used by the expected signal and the interfering signal are the same and locations of user equipments corresponding to the signals are close, the expected signal is relatively strongly interfered by the interfering signal, and thereby the at least one user equipment may be determined. In addition, according to various possible implementations of an apparatus executing the method in this embodiment, when needed, information needed for determining the at least one associated user equipment may be acquired by communicating with a base station and/or a user equipment.

The receiving matrix may also be referred to as a detection matrix, a U matrix, or the like. When a user equipment receives a signal by using multiple antennas, the receiving matrix is used to indicate how the user equipment receives the signal. By using the receiving matrix, at least a receiving direction (that is, each receiving direction comprised in the receiving matrix) and a direction in which ZF (ZeroForcing, zero forcing) is to be formed that are of the user equipment can be determined. In a case in which the receiving direction of the user equipment is known, an access base station of the user equipment may design a transmitting precoding matrix to cause an expected signal to be received within a subspace of the receiving matrix, and an interfering base station may design a transmitting precoding matrix to cause an interfering signal to fall beyond the subspace of the receiving matrix.

In step S140, a transmitting precoding matrix that is used by a target base station when transmitting an expected signal to a user equipment served by the target base station is designed according to a receiving matrix of at least one user equipment associated with the target base station, to cause that the expected signal that is sent when the determined transmitting precoding matrix is used has minimum interference to the at least one user equipment.

Figure 1B:
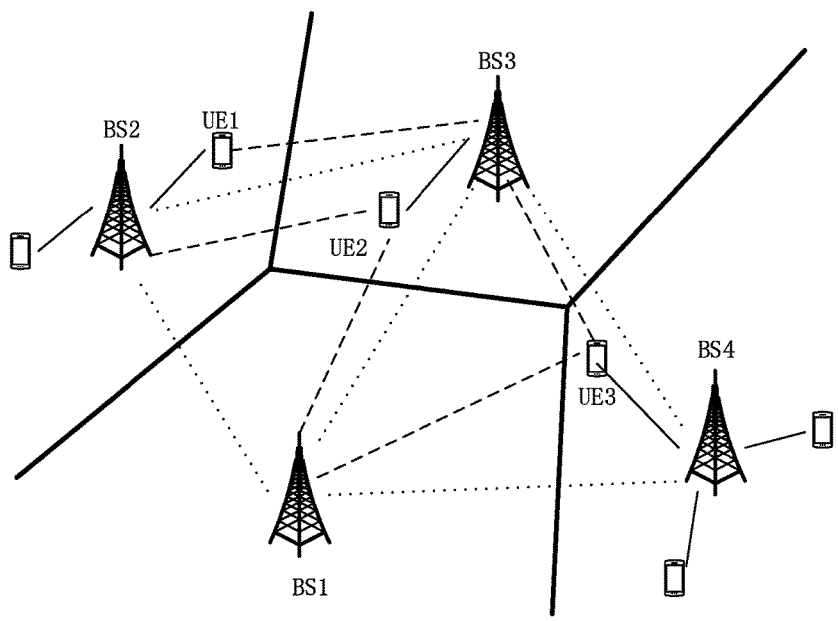
FIG. 1(b) is a schematic diagram of an exemplary ultra dense network.

A ultra dense network shown in FIG. 1(b) is used as an example. In this network, locations of base stations BS1, BS2, BS3, and BS4 and user equipments distribute randomly, where the BS1 is a macro base station, the base stations BS2, BS3, and BS4 are micro base stations, and the base stations can communicate with each other by using an X2 interface (communication between the base stations are shown by using dotted lines in FIG. 1(b)). Serving base stations of the UE1, the UE2, and the UE3 are the BS2, the BS3, and the BS4 respectively. As shown in FIG. 1(b), due to inter-cell interference, an expected signal (an expected signal is indicated by using a full line in FIG. 1(b)) sent by the BS3 to a served user of the BS3, that is, the UE2, causes interference to receiving a signal from the serving base station BS2 of the UE1 by the UE1 (an interfering signal is indicated by using a dashed line in FIG. 1(b)); the expected signal sent by the BS3 to the served user of the BS3, that is, the UE2, may cause interference to receiving a downstream signal from the BS4 by the UE3, and may also cause interference to receiving a downstream signal from the BS2 by the UE1, and so on.

To determine transmitting precoding matrices used by the base stations when transmitting expected signals, the method in this embodiment may be executed by any base station shown in FIG. 1(b) or an independent apparatus. Taking the base station BS3 as an example, a transmitting precoding matrix of the base station BS3 is determined according to the method in this embodiment, and the transmitting precoding matrix should cause that an expected signal transmitted by the BS3 to the UE2 has minimum interference to the UE1 and the UE3. According to the method in this embodiment, receiving matrices of the user equipments UE1 and UE3 are acquired, and the transmitting precoding matrix of the BS3 is designed based on the receiving matrices to cause that a signal-to-noise ratio of the expected signal can be maximized, and zero forcing in directions of the users UE1 and UE2 is formed, or interfering signals are directed at null spaces corresponding to the UE1 and the UE3. For designing of a transmitting precoding matrix of the base station BS2, according to the method in this embodiment, a receiving matrix of the UE2 is acquired, and based on the acquired receiving matrix, an interfering signal is directed at a null space corresponding to the UE2 or zero forcing is formed in a direction of the UE2. For another base station and another user equipment, deduction can be made by analogy.

To sum up, according to the method in this embodiment, a transmitting precoding matrix of a base station can be designed according to a receiving matrix of an interfered user equipment, thereby reducing inter-cell interference.

In the method in this embodiment, the first information may be any information that can be used to determine a receiving matrix of a user equipment.

In a possible implementation, the first information may comprise an index of the receiving matrix of the at least one user equipment. In this case, an apparatus and user equipments executing the method in this embodiment have known various possible receiving matrices and a corresponding index, and a corresponding receiving matrix can be determined, for example, in a querying manner in the case in which the index is known. That is, the method in this embodiment further comprises:

S131. Determine the receiving matrix of the at least one user equipment according to at least the index.

In another possible implementation, the first information may comprise a reference signal that is sent when the receiving matrix of the at least one user equipment is used as an upstream transmitting precoding matrix. For example, a user equipment may use a receiving matrix corresponding to the user equipment as an upstream transmitting precoding matrix, and send a reference signal in a multi-antenna manner. In such an implementation, the method in this embodiment further comprises:

S132: Determine the receiving matrix of the at least one user equipment according to at least the reference signal.

The reference signal may be restored based on any appropriate manner to determine the corresponding upstream transmitting precoding matrix, that is, the corresponding receiving matrix, which is a mature technology in the field, and should not impose limitation on the technical solution herein. For example, a technology disclosed in "Distributed Digital Method for Interference Alignment and its Application in Wireless Interference Network" published by Gomadam K, Cadambe V R, and Jafar S A in IEEE *Transactions on Information Theory*, 2011 may be used.

In another possible implementation, the first information may comprise the receiving matrix of the at least one user equipment. That is, a user equipment may convert a receiving matrix corresponding to the user equipment into a data information stream, and send the data information stream to an apparatus executing the method in this embodiment through a data channel in a single-antenna sending manner.

In the foregoing several implementations, a receiving matrix is already determined, and may be sent to an apparatus executing the method in this embodiment by using a user equipment or a serving base station of the user equipment or another entity. However, the receiving matrix may also not be determined yet, and may be determined based on the first information. Specifically:

In another possible implementation, the first information may comprise information related to a status of a channel between the at least one user equipment and at least one associated base station. For any user equipment, at least one associated base station is one or more base stations neighboring the user equipment, comprising a base station to be accessed (in an initial status) or a base station having been accessed (a served-cell base station) by the user equipment, and other neighboring base stations. The channel status related information is any information that can be used to determine a channel status, comprising channel status information (CSI), a broadcast signal and a reference signal of the at least one associated base station, or the like. In such an implementation, the method in this embodiment further comprises:

S133. Determine the receiving matrix of the at least one user equipment according to at least an access base station of the at least one user equipment and the channel status information.

For any user equipment, a receiving matrix corresponding to the user equipment may be determined in an appropriate manner based on a desired effect.

Specifically, if each user equipment receives only one channel of expected signal, a receiving matrix may be determined based on antenna selection (antenna selection). For example, a signal is received in only a direction of the expected signal to ensure that the user equipment can obtain a maximum output signal-to-noise ratio for the expected signal, and signals in other directions are considered to be noise. For such a receiving matrix, an interfering signal can be directed at the other directions when a transmitting precoding matrix of a target base station is designed.

Alternatively, the receiving matrix may be determined based on a maximal ratio combining (MRC) principle to ensure that the user equipment can obtain a maximum output signal-to-noise ratio for an expected signal, and signals in other directions are considered to be noise. For another example, the receiving matrix may be designed based on deterministic beam forming of angle-of-arrival estimation (AOA), to cause that an expected signal is received in an angle-of-arrival direction of the signal to increase receive power of the expected signal. For such a receiving matrix, an interfering signal can be directed at other directions when a transmitting precoding matrix of a target base station is designed. If each user equipment receives multiple channels of expected signals, a receiving matrix may be designed based on, for example, singular value decomposition (Singular Value Decomposition, SVD) for a channel. That is, when SVD of a channel matrix is $H=\tilde{U}^H \Lambda \tilde{V}$, the receiving matrix is designed to be $\tilde{U}$, or several columns of $\tilde{U}$.

In a case in which a serving cell has not been determined (that is, an access base station has not been determined) for a user equipment, the method in this embodiment further comprises:

S130. Determine the access base station of the at least one user equipment according to at least the channel status related information. Generally, for any user equipment, a base station having a good connection status with the user equipment, a high channel gain, a full-rank channel matrix, and large bandwidth may be selected, so as to achieve a relatively high data transmission rate.

In a possible implementation, the first information may further comprise a resource status and/or a load status of the at least one base station associated with the at least one user equipment. In this case, an access base station of each user equipment may further be determined based on the resource status and/or the load status, to avoid that the user equipment accesses a base station having exceedingly high load and is allocated insufficient resources.

In addition to the foregoing resource status and/or load status, the first information may further comprise other information of an access base station of a user equipment, for example, bandwidth and transmit power of a base station.

In another possible implementation, the first information may further comprise a second transmitting precoding matrix of the at least one base station associated with the at least one user equipment. For any user equipment, obtaining a transmitting precoding matrix that is currently used or to be used by a base station associated with the user equipment helps to design a better receiving matrix for the user equipment. In this case, the method in this embodiment may further comprise:

S134. Determine the receiving matrix of the at least one user equipment according to at least the access base station of the at least one user equipment, the channel status related information, and the second transmitting precoding matrix of the at least one base station associated with the at least one user equipment.

In this case, the receiving matrix may be determined based on various appropriate principles.

For example, a receiving matrix of each user equipment is determined based on a zero forcing principle. That is, except for an expected signal of the user equipment, signals are received by using a full interference suppression principle. The receiving matrix of each user equipment may also be determined based on an MMSE (minimum mean square error) principle. That is, signals are received at a receive end by using a principle of minimizing a mean square error. Taking the MMSE principle as an example, and taking a receiving matrix of the $i^{th}$ user equipment served by the $k^{th}$ base station in a system as an example, a receiving matrix $U_{k_i}$ of the user equipment may be designed according to the following formula:

$$U_{k_i} = \frac{\left(\sum_{j=1}^{K} \sum_{i} H_{k_i j} V_j V_j^H H_{k_i j}^H + \sigma^2 I\right)^{-1} H_{k_i k} V_k}{\left\|\left(\sum_{j=1}^{K} \sum_{i} H_{k_i j} V_j V_j^H H_{k_i j}^H + \sigma^2 I\right)^{-1} H_{k_i k} V_k\right\|}$$

K represents a quantity of base stations in the system, V represents a downstream transmitting precoding matrix (that is, a second transmitting precoding matrix) of each base station, a channel matrix for a channel from the $j^{th}$ base station to the $i^{th}$ user equipment served by the $k^{th}$ base station is $H_{k_i j}$, noise power is $\sigma^2$, and I represents a unit matrix.

It is to be noted that, according to a possible role of an apparatus executing the method in this embodiment and specific content of the first information, the first information may be acquired in any appropriate manner in step S120. For example, the first information may be acquired in a manner of direct communication with each user equipment. Alternatively, first information corresponding to each user equipment may be acquired in a manner of communication with a serving base station of each user equipment, and in a case in which an apparatus executing the method in this embodiment is a target base station, each piece of first information may be acquired by using an X2 interface. Alternatively, some pieces of first information may be acquired by communicating with user equipments, and other pieces of first information may be acquired by communicating with serving base stations of user equipments.

In addition, when an apparatus executing the method in this embodiment is independent from the target base station, the method in this embodiment further comprises:

S160. Send second information associated with the first transmitting precoding matrix. The second information may be any information that can be used to determine the first transmitting precoding matrix. Similar to the first information, the second information may be, for example, an index of transmitting precoding matrices, or a reference signal or data stream that can be used to restore a transmitting precoding matrix.

Apart from acquiring a receiving matrix of an interfered user equipment, in step S140, the first transmitting precoding matrix of the target base station is designed for a purpose of reducing interference to each user equipment. Based on a specific scenario and a desired effect, the first transmitting precoding matrix may be determined based on various principles. A desired effect may be, for example, forming zero forcing in a direction of one or more user equipments of the at least one user equipment, or directing interference at a null space corresponding to a receiving matrix of the user equipment. For example, a used principle is:

A minimum leakage principle, that is, minimizing interference of the target base station to each user equipment.

Specifically, a transmitting precoding matrix $V_{k_i}$ that is used by the $k^{th}$ base station when transmitting an expected signal to the $i^{th}$ user equipment served by the base station may be an eigenvector corresponding to several smallest eigenvalues in the following matrix.

$$\Sigma_{k_i \neq j_l} H_{j_l k}^H U^*_{j_l} U_{j_l}^T H_{j_l k}$$

$H_{j_l k}$ is a channel matrix for a channel from the $k^{th}$ base station to the other user equipment, except for the $i^{th}$ user equipment, served by the $k^{th}$ base station, that is, a user equipment associated with the $k^{th}$ base station, and $U_{j_l}$ is a receiving matrix of the other user equipment.

A maximum signal-to-leakage-and-noise ratio (SLNR) principle, that is, maximizing a ratio of receive power of receiving an expected signal by a user equipment served by the target base station to interference power for an interfered user equipment plus noise.

A minimum mean square error MMSE principle, according to which a transmitting precoding matrix $V_{k_i}$ used by the $k^{th}$ base station when sending an expected signal to the $i^{th}$ user equipment served by the $k^{th}$ base station is:

$$V_{k_i} = \frac{\left(\sum_{k_i \neq j_l} H_{j_l k}^H U_{j_l}^* U_{j_l}^T H_{j_l k} + \sigma^2 I\right)^{-1} H_{k_i k_i} U_k}{\left\|\left(\sum_{k_i \neq j_l} H_{j_l k}^H U_{j_l}^* U_{j_l}^T H_{j_l k} + \sigma^2 I\right)^{-1} H_{k_i k_i} U_k\right\|}$$

To sum up, according to the method in this embodiment, a receiving matrix of a user equipment may be determined based on various appropriate manners to maximize a signal-to-noise ratio of an expected signal. A transmitting precoding matrix of a base station is determined according to receiving matrices of user equipments, which not only reduces inter-cell interference, but also improve a signal-to-noise ratio and a data transmission rate of a served user. Only feedback of the receiving matrices by the user equipments is required, iteration is not needed, and a central controller is not relied on, which is easy to implement, and is more suitable for a ultra dense cellular network.

It is to be noted that, in the foregoing description of the method in this embodiment, a receiving matrix of the foregoing at least one associated user equipment is mainly considered in designing a transmitting precoding matrix of a target base station or an interfering base station, that is, mainly for a purpose of reducing inter-cell interference. However, it should be understood that, an expected signal that is sent by the target base station or interfering base station to a user equipment served by the target base station or interfering base station is an interfering signal interfering the foregoing at least one user equipment. Therefore, when the transmitting precoding matrix of the target base station or interfering base station is designed, receiving of the expected signal should also be considered, that is, a receiving matrix of the user equipment served by the target base station or interfering base station should be taken into overall consideration.

Figure 2:
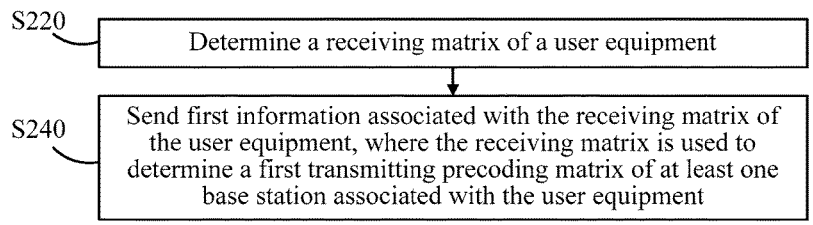
FIG. 2 is a flowchart of an example of an information sending method according to an embodiment of the present application.

FIG. 2 is a flowchart of an example of an information sending method according to an embodiment of the present application. The method can be executed by any user equipment or executed by an independent apparatus. As shown in FIG. 2, the method comprises:

S220. Determine a receiving matrix of a user equipment.

S240. Send first information associated with the receiving matrix of the user equipment, where the receiving matrix is used to determine a first transmitting precoding matrix of at least one base station associated with the user equipment.

As described with reference to FIG. 1(a), the at least one base station associated with the user equipment is a base station that causes interference to receiving an expected signal by the user equipment. Taking the case shown in FIG. 1(b) as an example, for a UE1, a base station BS3 is the associated base station; for a user UE2, base stations BS2 and BS1 are both the associated base stations.

The method in this embodiment is used to assist a base station side to design a transmitting precoding matrix, also referred to as a first transmitting precoding matrix, of the base station side. The first transmitting precoding matrix means a downstream transmitting precoding matrix used by an associated base station when transmitting a downstream signal to a user equipment served by the base station. The receiving matrix may also be referred to as a detection matrix, a U matrix, or the like. When a user equipment receives a signal by using multiple antennas, the receiving matrix is used to indicate how the user equipment receives the signal. By using the receiving matrix, at least a receiving direction (that is, each receiving direction comprised in the receiving matrix) and a direction in which ZF is to be formed that are of the user equipment can be determined. In a case in which the receiving direction of the user equipment is known, an access base station of the user equipment may design a transmitting precoding matrix to cause an expected signal to be received within a subspace of the receiving matrix, and an interfering base station may design a transmitting precoding matrix to cause an interfering signal to fall beyond the subspace of the receiving matrix.

To determine the receiving matrix of the user equipment, in a possible implementation, the method in this embodiment may further comprise:

S211: Acquire information related to a status of a channel between the user equipment and the at least one associated base station.

For any user equipment, at least one associated base station is one or more base stations neighboring the user equipment, comprising a base station to be accessed (in an initial status) or a base station having been accessed (a served-cell base station) by the user equipment, and other neighboring base stations. The channel status related information is any information that can be used to determine a channel status, comprising channel status information (CSI), a broadcast signal and a reference signal of the at least one associated base station, or the like.

In step S220, the receiving matrix of the user equipment may be determined according to at least an access base station of the user equipment and the channel status information.

For any user equipment, a receiving matrix corresponding to the user equipment may be determined in an appropriate manner based on a desired effect.

Specifically, if the user equipment sends only one channel of data, the receiving matrix may be determined based on antenna selection (antenna selection). For example, a signal is received in only a direction of an expected signal to ensure that the user equipment can obtain a maximum output signal-to-noise ratio for the expected signal, and signals in other directions are considered to be noise. For such a receiving matrix, an interfering signal can be directed at the other directions when a transmitting precoding matrix of a target base station is designed.

Alternatively, the receiving matrix may be determined based on a maximal ratio combining (MRC) principle to ensure that the user equipment can obtain a maximum output signal-to-noise ratio. For another example, the receiving matrix may be designed based on deterministic beam forming of angle-of-arrival estimation (AOA), to cause that an expected signal is received in an angle-of-arrival direction of the signal to increase receive power of the expected signal. For such a receiving matrix, an interfering signal can be directed at other directions when a transmitting precoding matrix of a target base station is designed. If the user equipment sends multiple channels of data, the receiving matrix may be designed based on, for example, singular value decomposition (Singular Value Decomposition, SVD)

for a channel. That is, when SVD of a channel matrix is $H=\tilde{U}^H \Lambda \tilde{V}$ the receiving matrix is designed to be $\tilde{U}$, or several columns of $\tilde{U}$.

In a case in which a serving cell has not been determined (that is, an access base station has not been determined) for the user equipment, the method in this embodiment may further comprise:

S212. Determine the access base station of the user equipment according to at least the channel status related information. Generally, a base station having a good connection status with the user equipment, a high channel gain, a full-rank channel matrix, and large bandwidth may be selected, so as to achieve a relatively high data transmission rate.

In a possible implementation, the method in this embodiment may further comprise:

S213. Acquire a resource status and/or a load status of the at least one base station associated with the user equipment.

In step S212, an access base station of the user equipment may further be determined based on the resource status and/or the load status, to avoid that the user equipment accesses a base station having exceedingly high load and is allocated insufficient resources.

In addition to the foregoing resource status and/or load status, in the method in this embodiment, other information of the access base station of the user equipment, for example, bandwidth and transmit power of the base station, may further be acquired.

In another possible implementation, the method in this embodiment may further comprise:

S215. Acquire a second transmitting precoding matrix of the at least one base station associated with the user equipment.

For any user equipment, obtaining a transmitting precoding matrix that is currently used or to be used by an associated base station helps to design a better receiving matrix for the user equipment.

In step S220, the receiving matrix of the user equipment may be determined according to at least the access base station of the user equipment, the channel status related information, and the second transmitting precoding matrix of the at least one base station associated with the user equipment.

For example, in this case, the receiving matrix of the user equipment may be determined based on a zero forcing principle. That is, except for an expected signal of the user equipment, signals are received by using a full interference suppression principle.

The receiving matrix of the user equipment may also be determined based on an MMSE (minimum mean square error) principle. That is, signals are received at a receive end by using a principle of minimizing a mean square error. Taking the MMSE principle as an example, and taking a receiving matrix of the $i^{th}$ user equipment served by the $k^{th}$ base station in a system as an example, a receiving matrix $U_{k_i}$ of the user equipment may be designed according to the following formula:

V represents a downstream transmitting precoding matrix (that is, a second transmitting precoding matrix) of each base station, a channel matrix for a channel from the $j^{th}$ base station to the $i^{th}$ user equipment served by the $k^{th}$ base station is $H_{k_i j}$, and noise power is $\sigma^2$.

It is to be noted that, according to a possible role of an apparatus executing the method in this embodiment, corresponding information may be acquired in any appropriate manner in steps S211, S213, and S215. For example, information may be acquired in a manner of direct communication with a base station.

In the method in this embodiment, the first information may be any information that can be used by an associated base station to determine the receiving matrix of the user equipment.

In a possible implementation, the first information may comprise an index of the receiving matrix of the user equipment. In this case, an apparatus and base stations executing the method in this embodiment have known various possible receiving matrices and a corresponding index, and a corresponding receiving matrix can be determined, for example, in a querying manner in the case in which the index is known.

In another possible implementation, the first information may comprise a reference signal that is sent when the receiving matrix of the user equipment is used as an upstream transmitting precoding matrix. For example, an apparatus executing the method in this embodiment may use a corresponding receiving matrix as an upstream transmitting precoding matrix, and send a reference signal in a multi-antenna manner.

In another possible implementation, the first information may comprise the receiving matrix of the user equipment. That is, an apparatus executing the method in this embodiment may convert a corresponding receiving matrix into a data information stream, and send the data information stream to an associated base station through a data channel in a single-antenna sending manner.

To sum up, the method in this embodiment helps to reduce inter-cell interference.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer readable medium comprising computer readable instructions. When the computer readable instructions are executed, the operations in the steps of the foregoing method in the implementation shown in FIG. 1(a) are performed.

In addition, an embodiment of the present application further provides a computer readable medium comprising computer readable instructions. When the computer readable instructions are executed, the operations in the steps of the foregoing method in the implementation shown in FIG. 2 are performed.

Figure 3A:
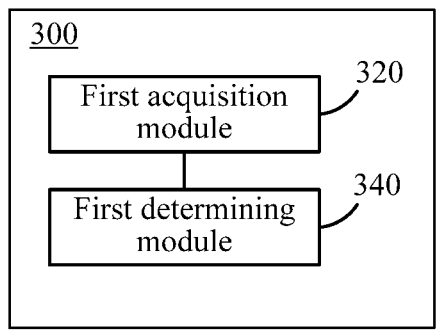
FIG. 3(a) to FIG. 3(d) are structural block diagrams of multiple examples of a precoding apparatus according to embodiments of the present application.

FIG. 3(a) is a structural block diagram of an example of a precoding apparatus according to an embodiment of the present application. The apparatus may be of any base station or may be an independent apparatus. As shown in FIG. 3(a), the precoding apparatus 300 in this embodiment comprises:

$$U_{k_i} = \frac{\left(\sum_{j=1}^{K}\sum_{i} H_{k_i j} V_j V_j^H H_{k_i j}^H + \sigma^2 I\right)^{-1} H_{k_i k} V_k}{\left\|\left(\sum_{j=1}^{K}\sum_{i} H_{k_i j} V_j V_j^H H_{k_i j}^H + \sigma^2 I\right)^{-1} H_{k_i k} V_k\right\|}$$

a first acquisition module 320, configured to acquire first information associated with a receiving matrix of at least one user equipment associated with a base station; and a first determining module 340, configured to determine a first transmitting precoding matrix of the base station according to at least the receiving matrix of the at least one user equipment.

According to the apparatus in this embodiment, a transmitting precoding matrix, also referred to as a first transmitting precoding matrix, of a base station is designed based on a purpose of reducing interference caused by the base station to a user that may be interfered by the base station. The first transmitting precoding matrix means a downstream transmitting precoding matrix that is used by the base station when transmitting a downstream signal to a user equipment served by the base station. In the apparatus in this embodiment, a base station for which a transmitting precoding matrix is determined (also referred to as a target base station or an interfering base station below) may be any base station. At least one user equipment associated with the base station is a user equipment that may be interfered by the base station, that is, when receiving an expected signal sent by a served-cell base station of the at least one associated user equipment, the user equipment is interfered by a signal (also referred to as an interfering signal) sent by the target base station. The at least one associated user equipment may be determined according to a relative position of each user equipment relative to the target base station and an allocation status of used resources. For example, when resources used by the expected signal and the interfering signal are the same and locations of user equipments corresponding to the signals are close, the expected signal is relatively strongly interfered by the interfering signal, and thereby the at least one user equipment may be determined. In addition, according to various possible implementations of an apparatus executing the method in this embodiment, when needed, information needed for determining the at least one associated user equipment may be acquired by communicating with a base station and/or a user equipment.

The receiving matrix may also be referred to as a detection matrix, a U matrix, or the like. When a user equipment receives a signal by using multiple antennas, the receiving matrix is used to indicate how the user equipment receives the signal. By using the receiving matrix, at least a receiving direction (that is, each receiving direction comprised in the receiving matrix) and a direction in which ZF is to be formed that are of the user equipment can be determined. In a case in which the receiving direction of the user equipment is known, an access base station of the user equipment may design a transmitting precoding matrix to cause an expected signal to be received within a subspace of the receiving matrix, and an interfering base station may design a transmitting precoding matrix to cause an interfering signal to fall beyond the subspace of the receiving matrix.

The first determining module 340 may design, according to a receiving matrix of at least one user equipment associated with a target base station, a transmitting precoding matrix that is used by the target base station when transmitting an expected signal to a user equipment served by the target base station, to cause that the expected signal that is sent when the determined transmitting precoding matrix is used has minimum interference to the at least one user equipment.

A ultra dense network shown in FIG. 1(b) is used as an example. In this network, locations of base stations BS1, BS2, BS3, and BS4 and user equipments distribute randomly, where the BS1 is a macro base station, the base stations BS2, BS3, and BS4 are micro base stations, and the base stations can communicate with each other by using an X2 interface (communication between the base stations are shown by using dotted lines in FIG. 1(b)). Serving base stations of the UE1, the UE2, and the UE3 are the BS2, the BS3, and the BS4 respectively. As shown in FIG. 1(b), due to inter-cell interference, an expected signal (an expected signal is indicated by using a full line in FIG. 1(b)) sent by the BS3 to a served user of the BS3, that is, the UE2, causes interference to receiving a signal from the serving base station BS2 of the UE1 by the UE1 (an interfering signal is indicated by using a dashed line in FIG. 1(b)); the expected signal sent by the BS3 to the served user of the BS3, that is, the UE2, may cause interference to receiving a downstream signal from the BS4 by the UE3, and may also cause interference to receiving a downstream signal from the BS2 by the UE1, and so on.

For the base station BS3, a transmitting precoding matrix of the base station BS3 is determined by using the apparatus in this embodiment, and the transmitting precoding matrix should cause that an expected signal transmitted by the BS3 to the UE2 has minimum interference to the UE1 and the UE3. According to the apparatus in this embodiment, receiving matrices of the user equipments UE1 and UE3 are acquired by the first acquisition module 320, and the first determining module 340 designs the transmitting precoding matrix of the BS3 based on the receiving matrices to cause that a signal-to-noise ratio of the expected signal can be maximized, and zero forcing in directions of the users UE1 and UE2 is formed, or interfering signals are directed at null spaces corresponding to the UE1 and the UE3. For designing of a transmitting precoding matrix of the base station BS2, according to the apparatus in this embodiment, a receiving matrix of the UE2 is acquired by the first acquisition module 320, and based on the acquired receiving matrix, the first determining module 340 directs an interfering signal at a null space corresponding to the UE2, or zero forcing is formed in a direction of the UE2. For another base station and another user equipment, deduction can be made by analogy.

To sum up, according to the apparatus in this embodiment, a transmitting precoding matrix of a base station can be designed according to a receiving matrix of an interfered user equipment, thereby reducing inter-cell interference.

Figure 3B:
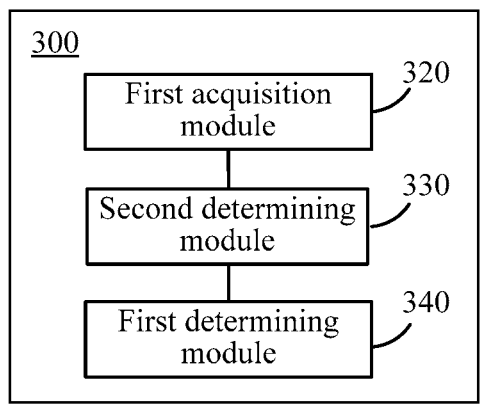

As shown in FIG. 3(b), the apparatus 300 in this embodiment may further comprise:

a second determining module 330, configured to determine the receiving matrix of the at least one user equipment according to at least the first information.

In the apparatus in this embodiment, the first information may be any information that can be used to determine a receiving matrix of a user equipment.

In a possible implementation, the first information may comprise an index of the receiving matrix of the at least one user equipment. In this case, the apparatus and user equipments in this embodiment have known various possible receiving matrices and a corresponding index, and a corresponding receiving matrix can be determined, for example, in a querying manner in the case in which the index is known. That is, the second determining module 330 may determine the receiving matrix of the at least one user equipment according to at least the index.

In another possible implementation, the first information may comprise a reference signal that is sent when the receiving matrix of the at least one user equipment is used as an upstream transmitting precoding matrix. For example, a user equipment may use a receiving matrix corresponding to the user equipment as an upstream transmitting precoding matrix, and send a reference signal in a multi-antenna manner. In such an implementation, the second determining module 330 may determine the receiving matrix of the at least one user equipment according to at least the reference signal.

The second determining module 330 may restore the reference signal based on any appropriate manner to determine the corresponding upstream transmitting precoding matrix, that is, the corresponding receiving matrix, which is a mature technology in the field, and should not impose limitation on the technical solution herein. For example, a technology disclosed in "Distributed Digital Method for Interference Alignment and its Application in Wireless Interference Network" published by Gomadam K, Cadambe V R, and Jafar S A in IEEE *Transactions on Information Theory*, 2011 may be used.

In another possible implementation, the first information may comprise the receiving matrix of the at least one user equipment. That is, a user equipment may convert a receiving matrix corresponding to the user equipment into a data information stream, and send the data information stream to the first acquisition module 320 through a data channel in a single-antenna sending manner.

In the foregoing several implementations, a receiving matrix has been determined, and may be sent to the apparatus in this embodiment by using a user equipment or a serving base station of the user equipment or another entity. However, the receiving matrix may also not be determined yet, and may be determined based on the first information. Specifically:

In another possible implementation, the first information may comprise information related to a status of a channel between the at least one user equipment and at least one associated base station. For any user equipment, at least one associated base station is one or more base stations neighboring the user equipment, comprising a base station to be accessed (in an initial status) or a base station having been accessed (a served-cell base station) by the user equipment, and other neighboring base stations. The channel status related information is any information that can be used to determine a channel status, comprising channel status information (CSI), a broadcast signal and a reference signal of the at least one associated base station, or the like. In such an implementation, the second determining module 330 may determine the receiving matrix of the at least one user equipment according to at least an access base station of the at least one user equipment and the channel status information.

For any user equipment, a receiving matrix corresponding to the user equipment may be determined in an appropriate manner based on a desired effect.

Specifically, if each user equipment receives only one channel of expected signal, the second determining module 330 may determine a receiving matrix based on antenna selection (antenna selection). For example, a signal is received in only a direction of the expected signal to ensure that the user equipment can obtain a maximum output signal-to-noise ratio for the expected signal, and signals in other directions are considered to be noise. For such a receiving matrix, an interfering signal can be directed at the other directions when a transmitting precoding matrix of a target base station is designed.

Alternatively, the second determining module 330 may determine the receiving matrix based on a maximal ratio combining (MRC) principle to ensure that the user equipment can obtain a maximum output signal-to-noise ratio for an expected signal, and signals in other directions are considered to be noise. For another example, the second determining module 330 may determine the receiving matrix based on deterministic beam forming of angle-of-arrival estimation (AOA), to cause that an expected signal is received in an angle-of-arrival direction of the signal to increase receive power of the expected signal. For such a receiving matrix, an interfering signal can be directed at other directions when a transmitting precoding matrix of a target base station is designed. If each user equipment receives multiple channels of expected signals, a receiving matrix may be designed based on, for example, singular value decomposition (Singular Value Decomposition, SVD) for a channel. That is, when SVD of a channel matrix is $H=\tilde{U}^H \Lambda \tilde{V}$, the receiving matrix is designed to be $\tilde{U}$, or several columns of $\tilde{U}$.

Figure 3C:
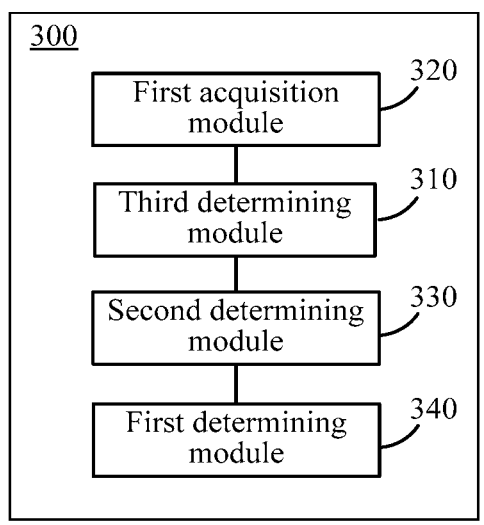

As shown in FIG. 3(c), the apparatus in this embodiment further comprises: a third determining module 310, configured to determine an access base station of the at least one user equipment according to at least the channel status related information in a case in which a serving cell has not been determined (that is, an access base station has not been determined) for a user equipment. Generally, for any user equipment, a base station having a good connection status with the user equipment, a high channel gain, a full-rank channel matrix, and large bandwidth may be selected, so as to achieve a relatively high data transmission rate.

In a possible implementation, the first information may further comprise a resource status and/or a load status of the at least one base station associated with the at least one user equipment. In this case, the third determining module 310 may further determine an access base station of each user equipment based on the resource status and/or the load status, to avoid that the user equipment accesses a base station having exceedingly high load and is allocated insufficient resources.

In addition to the foregoing resource status and/or load status, the first information may further comprise other information of an access base station of a user equipment, for example, bandwidth and transmit power of a base station.

In another possible implementation, the first information may further comprise a second transmitting precoding matrix of the at least one base station associated with the at least one user equipment. For any user equipment, obtaining a transmitting precoding matrix that is currently used or to be used by a base station associated with the user equipment helps to design a better receiving matrix for the user equipment. In this case, the first determining module 340 may determine the receiving matrix of the at least one user equipment according to at least the access base station of the at least one user equipment, the channel status related information, and the second transmitting precoding matrix of the at least one base station associated with the at least one user equipment.

In this case, the first determining module 340 may determine the receiving matrix based on various appropriate principles.

For example, a receiving matrix of each user equipment is determined based on a zero forcing principle. That is, except for an expected signal of the user equipment, signals are received by using a full interference suppression principle. The first determining module 340 may also determine the receiving matrix of each user equipment based on an MMSE (minimum mean square error) principle. That is, signals are received at a receive end by using a principle of minimizing a mean square error. Taking the MMSE principle as an example, and taking a receiving matrix of the i$^{th}$ user equipment served by the k$^{th}$ base station in a system as an example, a receiving matrix U$_{k_i}$ of the user equipment may be designed according to the following formula:

$$U_{k_i} = \frac{\left(\sum_{j=1}^{K}\sum_{i} H_{k_i,j} V_j V_j^H H_{k_i,j}^H + \sigma^2 I\right)^{-1} H_{k_i k} V_k}{\left\|\left(\sum_{j=1}^{K}\sum_{i} H_{k_i,j} V_j V_j^H H_{k_i,j}^H + \sigma^2 I\right)^{-1}\right)^{-1} H_{k_i k} V_k\right\|}$$

K represents a quantity of base stations in the system, V represents a downstream transmitting precoding matrix (that is, a second transmitting precoding matrix) of each base station, a channel matrix for a channel from the j$^{th}$ base station to the i$^{th}$ user equipment served by the k$^{th}$ base station is H$_{k_i j}$, noise power is $\sigma^2$, and I represents a unit matrix.

It is to be noted that, according to a possible role of the apparatus in this embodiment and specific content of the first information, the first acquisition module 320 may acquire the first information in any appropriate manner. For example, the first information may be acquired in a manner of direct communication with each user equipment. Alternatively, first information corresponding to each user equipment may be acquired in a manner of communication with a serving base station of each user equipment, and in a case in which the apparatus in this embodiment is a target base station, each piece of first information may be acquired by using an X2 interface. Alternatively, some pieces of first information may be acquired by communicating with user equipments, and other pieces of first information may be acquired by communicating with serving base stations of user equipments.

Figure 3D:
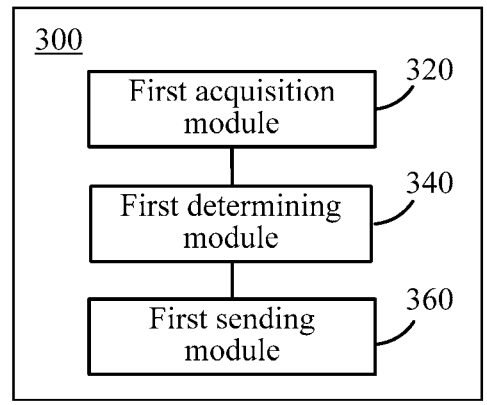

In addition, when the apparatus in this embodiment is independent from the target base station, as shown in FIG. 3(d), the apparatus 300 in this embodiment may further comprise:

a first sending module 360, configured to send second information associated with the first transmitting precoding matrix. The second information may be any information that can be used to determine the first transmitting precoding matrix. Similar to the first information, the second information may be, for example, an index of transmitting precoding matrices, or a reference signal or data stream that can be used to restore a transmitting precoding matrix.

Apart from acquiring a receiving matrix of an interfered user equipment, the first determining module 340 designs a first transmitting precoding matrix of a target base station for a purpose of reducing interference to each user equipment. Based on a specific scenario and a desired effect, the first transmitting precoding matrix may be determined based on various principles. A desired effect may be, for example, forming zero forcing in a direction of one or more user equipments of the at least one user equipment, or directing interference at a null space corresponding to a receiving matrix of the user equipment. For example, a used principle is:

A minimum leakage principle, that is, minimizing interference of the target base station to each user equipment. Specifically, a transmitting precoding matrix V$_{k_i}$ that is used by the k$^{th}$ base station when transmitting an expected signal to the i$^{th}$ user equipment served by the base station may be an eigenvector corresponding to several smallest eigenvalues in the following matrix.

$\Sigma_{k_j \neq j_l} H_{j_l k}^H U_{j_l}^* U_{j_l}^T H_{j_l k}$

H$_{j_l k}$ is a channel matrix for a channel from the k$^{th}$ base station to the other user equipment, except for the i$^{th}$ user equipment, served by the k$^{th}$ base station, that is, a user equipment associated with the k$^{th}$ base station, and U$_{j_l}$ is a receiving matrix of the other user equipment. A maximum signal-to-leakage-and-noise ratio (SLNR) principle, that is, maximizing a ratio of receive power of receiving an expected signal by a user equipment served by the target base station to interference power for an interfered user equipment plus noise.

A minimum mean square error MMSE principle, according to which a transmitting precoding matrix V$_{k_i}$ used by the k$^{th}$ base station when sending an expected signal to the i$^{th}$ user equipment served by the k$^{th}$ base station is:

$$V_{k_i} = \frac{\left(\sum_{k_i \neq j_l} H_{j_l k}^H U_{j_l}^* U_{j_l}^T H_{j_l k} + \sigma^2 I\right)^{-1} H_{k_i k_i} U_k}{\left\|\left(\sum_{k_i \neq j_l} H_{j_l k}^H U_{j_l}^* U_{j_l}^T H_{j_l k} + \sigma^2 I\right)^{-1} H_{k_i k_i} U_k\right\|}$$

To sum up, according to the apparatus in this embodiment, a receiving matrix of a user equipment may be determined based on various appropriate manners to maximize a signal-to-noise ratio of an expected signal. A transmitting precoding matrix of a base station is determined according to receiving matrices of user equipments, which not only reduces inter-cell interference, but also improve a signal-to-noise ratio and a data transmission rate of a served user. Only feedback of the receiving matrices by the user equipments is required, iteration is not needed, and a central controller is not relied on, which is easy to implement, and is more suitable for a ultra dense cellular network.

It is to be noted that, in the foregoing description of the apparatus in this embodiment, a receiving matrix of the foregoing at least one associated user equipment is mainly considered in designing a transmitting precoding matrix of a target base station or an interfering base station, that is, mainly for a purpose of reducing inter-cell interference. However, it should be understood that, an expected signal that is sent by the target base station or interfering base station to a user equipment served by the target base station or interfering base station is an interfering signal interfering the foregoing at least one user equipment. Therefore, when the transmitting precoding matrix of the target base station or interfering base station is designed, receiving of the expected signal should also be considered, that is, a receiving matrix of the user equipment served by the target base station or interfering base station should be taken into overall consideration.

Figure 4A:
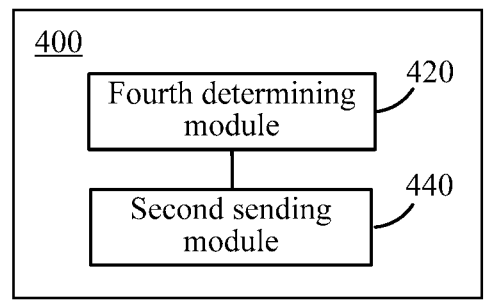
FIG. 4(a) to FIG. 4(c) are structural block diagrams of multiple examples of an information sending apparatus according to embodiments of the present application.

FIG. 4(a) is a flowchart of an example of an information sending apparatus according to an embodiment of the present application. The apparatus may be of any user equipment or may be an independent apparatus. As shown in FIG. 4(a), the apparatus 400 in this embodiment comprises:

a fourth determining module 420, configured to determine a receiving matrix of a user equipment;

a second sending module 440, configured to send first information associated with the receiving matrix of the user equipment, where the receiving matrix is used to determine a first transmitting precoding matrix of at least one base station associated with the user equipment.

As described with reference to FIG. 3(a) to FIG. 3(d), the at least one base station associated with the user equipment is a base station that causes interference to receiving an expected signal by the user equipment. Taking the case shown in FIG. 1(b) as an example, for a UE1, a base station BS3 is the associated base station; for a user UE2, base stations BS2 and BS1 are both the associated base stations.

The apparatus in this embodiment may assist a base station side to design a transmitting precoding matrix, also referred to as a first transmitting precoding matrix, of the base station side. The first transmitting precoding matrix means a downstream transmitting precoding matrix used by an associated base station when transmitting a downstream signal to a user equipment served by the base station. The receiving matrix may also be referred to as a detection matrix, a U matrix, or the like. When a user equipment receives a signal by using multiple antennas, the receiving matrix is used to indicate how the user equipment receives the signal. By using the receiving matrix, at least a receiving direction (that is, each receiving direction comprised in the receiving matrix) and a direction in which ZF is to be formed that are of the user equipment can be determined. In a case in which the receiving direction of the user equipment is known, an access base station of the user equipment may design a transmitting precoding matrix to cause an expected signal to be received within a subspace of the receiving matrix, and an interfering base station may design a transmitting precoding matrix to cause an interfering signal to fall beyond the subspace of the receiving matrix.

Figure 4B:
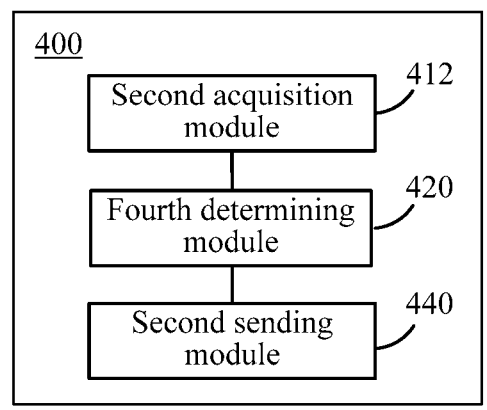

To determine the receiving matrix of the user equipment, in a possible implementation, as shown in FIG. 4(b), the apparatus in this embodiment may further comprise:

a second acquisition module 412, configured to acquire information related to a status of a channel between the user equipment and the at least one associated base station.

For any user equipment, at least one associated base station is one or more base stations neighboring the user equipment, comprising a base station to be accessed (in an initial status) or a base station having been accessed (a served-cell base station) by the user equipment, and other neighboring base stations. The channel status related information is any information that can be used to determine a channel status, comprising channel status information (CSI), a broadcast signal and a reference signal of the at least one associated base station, or the like.

The fourth determining module 420 may determine the receiving matrix of the user equipment according to at least an access base station of the user equipment and the channel status information.

For any user equipment, a receiving matrix corresponding to the user equipment may be determined in an appropriate manner based on a desired effect.

Specifically, if the user equipment sends only one channel of data, a receiving matrix may be determined based on antenna selection (antenna selection). For example, a signal is received in only a direction of an expected signal to ensure that the user equipment can obtain a maximum output signal-to-noise ratio for the expected signal, and signals in other directions are considered to be noise. For such a receiving matrix, an interfering signal can be directed at the other directions when a transmitting precoding matrix of a target base station is designed. Alternatively, the receiving matrix may be determined based on a maximal ratio combining (MRC) principle to ensure that the user equipment can obtain a maximum output signal-to-noise ratio. For another example, the receiving matrix may be designed based on deterministic beam forming of angle-of-arrival estimation (AOA), to cause that an expected signal is received in an angle-of-arrival direction of the signal to increase receive power of the expected signal. For such a receiving matrix, an interfering signal can be directed at other directions when a transmitting precoding matrix of a target base station is designed. If the user equipment sends multiple channels of data, the receiving matrix may be designed based on, for example, singular value decomposition (Singular Value Decomposition, SVD) for a channel. That is, when SVD of a channel matrix is $H=\tilde{U}^H \Lambda \tilde{V}$, the receiving matrix is designed to be $\tilde{U}$, or several columns of $\tilde{U}$.

Figure 4C:
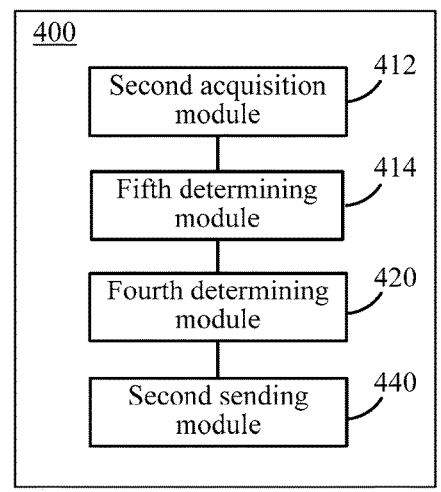

As shown in FIG. 4(c), the apparatus in this embodiment may further comprise:

a fifth determining module 414, configured to determine an access base station of the user equipment according to at least the channel status related information in a case in which a serving cell has not been determined (that is, the access base station has not been determined) for the user equipment. Generally, a base station having a good connection status with the user equipment, a high channel gain, a full-rank channel matrix, and large bandwidth may be selected, so as to achieve a relatively high data transmission rate.

In a possible implementation, the second acquisition module 411 may further be configured to acquire a resource status and/or a load status of the at least one base station associated with the user equipment.

The fifth determining module 414 may further determine an access base station of the user equipment based on the resource status and/or the load status, to avoid that the user equipment accesses a base station having exceedingly high load and is allocated insufficient resources.

In addition to the foregoing resource status and/or load status, the second acquisition module 411 may further be configured to acquire other information of the access base station of the user equipment, for example, bandwidth and transmit power of the base station.

In another possible implementation, the fifth determining module 414 may further be configured to acquire a second transmitting precoding matrix of the at least one base station associated with the user equipment.

For any user equipment, obtaining a transmitting precoding matrix that is currently used or to be used by an associated base station helps to design a better receiving matrix for the user equipment.

The fourth determining module 440 may determine the receiving matrix of the user equipment according to at least the access base station of the user equipment, the channel status related information, and the second transmitting precoding matrix of the at least one base station associated with the user equipment.

For example, in this case, the receiving matrix of the user equipment may be determined based on a zero forcing principle. That is, except for an expected signal of the user equipment, signals are received by using a full interference suppression principle. The receiving matrix of the user equipment may also be determined based on an MMSE (minimum mean square error) principle. That is, signals are received at a receive end by using a principle of minimizing a mean square error. Taking the MMSE principle as an example, and taking a receiving matrix of the $i^{th}$ user equipment served by the $k^{th}$ base station in a system as an example, a receiving matrix $U_{k_i}$ of the user equipment may be designed according to the following formula:

$$U_{k_i} = \frac{\left(\sum_{j=1}^{K}\sum_{i} H_{k_ij}V_j V_j^H H_{k_ij}^H + \sigma^2 I\right)^{-1} H_{k_ik}V_k}{\left\|\left(\sum_{j=1}^{K}\sum_{i} H_{k_ij}V_j V_j^H H_{k_ij}^H + \sigma^2 I\right)^{-1}\right)^{-1} H_{k_ik}V_k\right\|}$$

V represents a downstream transmitting precoding matrix (that is, a second transmitting precoding matrix) of each base station, a channel matrix for a channel from the $j^{th}$ base station to the $i^{th}$ user equipment served by the $k^{th}$ base station is $H_{k_ij}$, and noise power is $\sigma^2$. It is to be noted that, according to a possible role of the apparatus in this embodiment, the second acquisition module 411 may acquire corresponding information in any appropriate manner. For example, information may be acquired in a manner of direct communication with a base station.

In addition, for the apparatus in this embodiment, the first information may be any information that can be used by an associated base station to determine the receiving matrix of the user equipment.

In a possible implementation, the first information may comprise an index of the receiving matrix of the user equipment. In this case, the apparatus and base stations in this embodiment have known various possible receiving matrices and a corresponding index, and a corresponding receiving matrix can be determined, for example, in a querying manner in the case in which the index is known.

In another possible implementation, the first information may comprise a reference signal that is sent when the receiving matrix of the user equipment is used as an upstream transmitting precoding matrix. For example, the second sending module 440 may use a corresponding receiving matrix as an upstream transmitting precoding matrix, and send a reference signal in a multi-antenna manner.

In another possible implementation, the first information may comprise the receiving matrix of the user equipment. That is, the second sending module 440 may convert a corresponding receiving matrix into a data information stream, and send the data information stream to an associated base station through a data channel in a single-antenna sending manner.

To sum up, the apparatus in this embodiment helps to reduce inter-cell interference.

Figure 5:
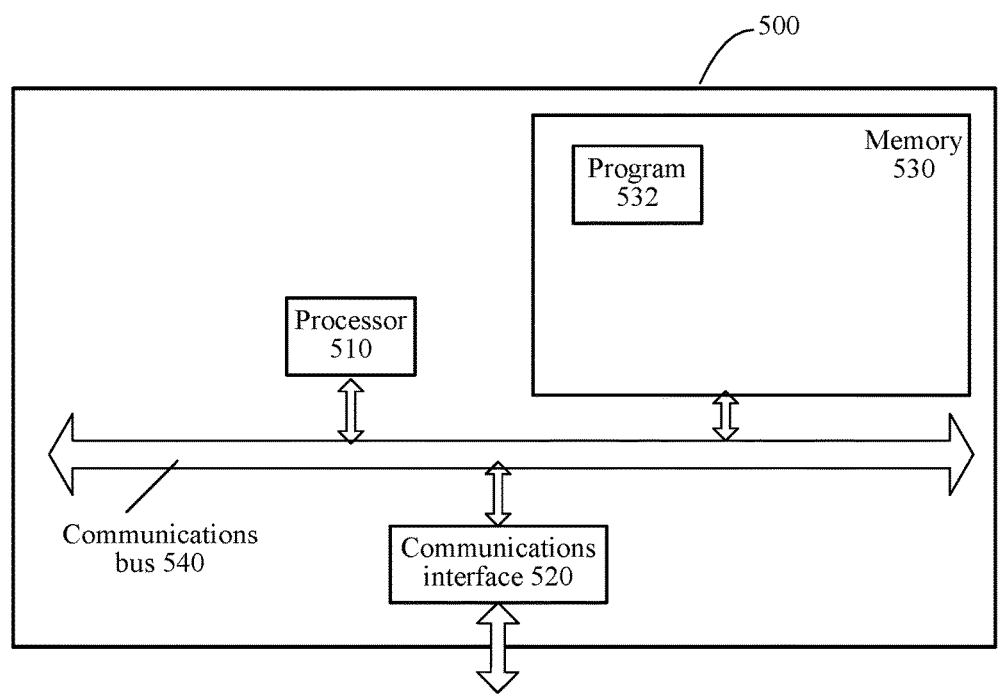
FIG. 5 is a structural block diagram of another example of a precoding apparatus according to an embodiment of the present application.

FIG. 5 is a schematic structural diagram of another example of a precoding apparatus provided in an embodiment of the present application. Specific embodiments of the present application do not set limitation to specific implementation of the precoding apparatus. As shown in FIG. 5, the precoding apparatus 500 may comprise:

a processor (processor) 510, a communications interface (Communications Interface) 520, a memory (memory) 530, and a communications bus 540, where, the processor 510, the communications interface 520, and the memory 530 communicate with each other through the communications bus 540.

The communications interface 520 is configured for communication with a network element such as a client.

The processor 510 is configured to execute a program 532, and specifically, can perform related steps in the foregoing method embodiment.

Specifically, the program 532 may comprise program code, where the program code comprises computer operation instructions.

The processor 510 may be a central processor unit CPU, or an application-specific integrated circuit ASIC (Application Specific Integrated Circuit), or one or more integrated circuits configured to implement this embodiment of the present application.

The memory 530 is configured to store the program 532. The memory 530 may comprise a high-speed RAM memory, and may also comprise a non-volatile memory (non-volatile memory), for example, at least one magnetic disk storage. Specifically, the program 532 may be used to cause the precoding apparatus 500 to perform the following steps:

acquiring first information associated with a receiving matrix of at least one user equipment associated with a base station; and determining a first transmitting precoding matrix of the base station according to at least the receiving matrix of the at least one user equipment.

For the specific implementation of the steps in the program 532, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 6:
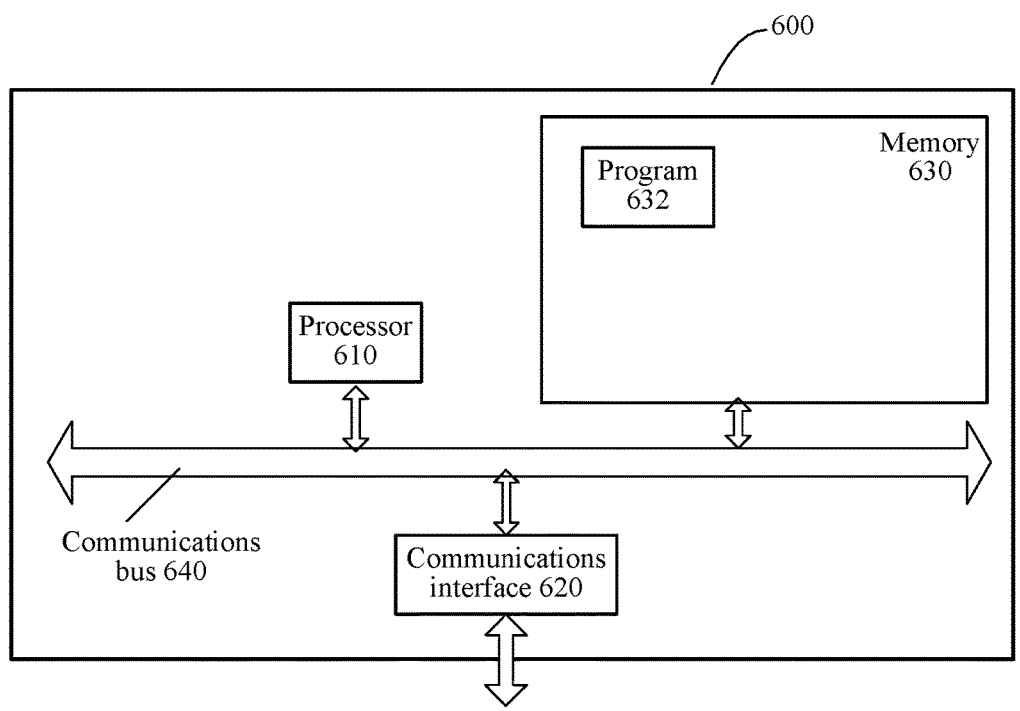
FIG. 6 is a structural block diagram of another example of an information sending apparatus according to an embodiment of the present application.

FIG. 6 is a schematic structural diagram of another example of an information sending apparatus provided in an embodiment of the present application. Specific embodiments of the present application do not set limitation to specific implementation of the information sending apparatus. As shown in FIG. 6, the information sending apparatus 600 may comprise:

a processor (processor) 610, a communications interface (Communications Interface) 620, a memory (memory) 630, and a communications bus 640, where, the processor 610, the communications interface 620, and the memory 630 communicate with each other through the communications bus 640.

The communications interface 620 is configured for communication with a network element such as a client.

The processor 610 is configured to execute a program 632, and specifically, can perform related steps in the foregoing method embodiment.

Specifically, the program 632 may comprise program code, where the program code comprises computer operation instructions.

The processor 610 may be a central processor unit CPU, or an application-specific integrated circuit ASIC (Application Specific Integrated Circuit), or one or more integrated circuits configured to implement this embodiment of the present application.

The memory 630 is configured to store the program 632. The memory 630 may comprise a high-speed RAM memory, and may also comprise a non-volatile memory (non-volatile memory), for example, at least one magnetic disk storage. Specifically, the program 632 may be used to cause the information sending apparatus 600 to perform the following steps:

determining a receiving matrix of a user equipment;

sending first information associated with the receiving matrix of the user equipment, where the receiving matrix is used to determine a first transmitting precoding matrix of at least one base station associated with the user equipment.

For the specific implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present invention, rather than limit the present invention; various alterations and variants can be made by those of ordinary skill in the art without departing from the spirit and scope of the present invention, so all equivalent technical solutions also belong to the scope of the present invention, and the scope of patent protection of the present invention should be defined by claims.

What is claimed is:

1. A precoding method, wherein the method comprises:
   acquiring first information associated with a receiving matrix of at least one user equipment that is interfered by an interfering base station;
   determining a first transmitting precoding matrix of the interfering base station according to at least the receiving matrix of the at least one user equipment to cause an interfering signal sent by the interfering base station to fall beyond a subspace of the receiving matrix of the at least one user equipment, wherein the first information comprises channel status related information between the at least one user equipment and at least one associated base station, and a second transmitting precoding matrix of the at least one base station associated with the at least one user equipment; and
   determining the receiving matrix of the at least one user equipment according to at least one access base station of the at least one user equipment, the channel status related information, and the second transmitting precoding matrix of the at least one base station associated with the at least one user equipment.

2. The method of claim 1, wherein the first information comprises an index of the receiving matrix of the at least one user equipment; and
   the method further comprises:
   determining the receiving matrix of the at least one user equipment according to at least the index.

3. The method of claim 1, wherein the first information comprises a reference signal that is sent when the receiving matrix of the at least one user equipment is used as an upstream transmitting precoding matrix; and
   the method further comprises:
   determining the receiving matrix of the at least one user equipment according to at least the reference signal.

4. The method of claim 1, wherein the first information comprises the receiving matrix of the at least one user equipment.

5. The method of claim 1, wherein the method further comprises: determining the access base station of the at least one user equipment according to at least the channel status related information.

6. The method of claim 5, wherein the first information further comprises a resource status and/or a load status of the at least one base station associated with the at least one user equipment; and
   the determining the access base station of the at least one user equipment further comprises:
   determining the access base station of the at least one user equipment according to at least the channel status information and the resource status and/or the load status.

7. The method of claim 1, wherein the acquiring first information associated with a receiving matrix of at least one user equipment comprises:

receiving the first information that is sent by at least one of at least one base station associated with the at least one user equipment.

8. The method of claim 1, wherein the method further comprises:
sending second information associated with the first transmitting precoding matrix.

9. An information sending method, wherein the method comprises:
determining a receiving matrix of a user equipment;
sending first information associated with the receiving matrix of the user equipment, wherein the receiving matrix is used to determine a first transmitting precoding matrix of at least one interfering base station which causes interference with the user equipment to cause an interfering signal sent by the interfering base station to fall beyond a subspace of the receiving matrix of the at least one user equipment; and
acquiring a second transmitting precoding matrix of the at least one base station associated with the user equipment, wherein the determining a receiving matrix of a user equipment comprises:
determining the receiving matrix of the user equipment according to at least the access base station of the user equipment, the channel status related information, and the second transmitting precoding matrix of the at least one base station associated with the user equipment.

10. The method of claim 9, wherein the method further comprises:
acquiring information related to a status of a channel between the user equipment and the at least one associated base station.

11. The method of claim 10, wherein the method further comprises:
determining the access base station of the user equipment according to at least the channel status related information.

12. The method of claim 11, wherein the method further comprises:
acquiring a resource status and/or a load status of the at least one base station associated with the user equipment; and
the determining the access base station of the user equipment further comprises:
determining the access base station of the user equipment according to at least the channel status information and the resource status and/or the load status.

13. The method of claim 9, wherein the first information comprises an index of the receiving matrix of the user equipment.

14. The method of claim 9, wherein the first information comprises a reference signal that is sent when the receiving matrix of the user equipment is used as an upstream transmitting precoding matrix.

15. The method of claim 9, wherein the first information comprises the receiving matrix of the user equipment.

16. A precoding apparatus, wherein the apparatus comprises:
a first acquisition module, configured to acquire first information associated with a receiving matrix of at least one user equipment that is interfered by an interfering base station;
a first determining module, configured to determine a first transmitting precoding matrix of the interfering base station according to at least the receiving matrix of the at least one user equipment to cause an interfering signal sent by the interfering base station to fall beyond a subspace of the receiving matrix of the at least one user equipment, wherein the first information comprises channel status related information between the at least one user equipment and at least one associated base station, and a second transmitting precoding matrix of the at least one base station associated with the at least one user equipment; and
a second determining module, configured to determine the receiving matrix of the at least one user equipment according to at least one access base station of the at least one user equipment, the channel status related information, and the second transmitting precoding matrix of the at least one base station associated with the at least one user equipment.

17. The apparatus of claim 16, wherein the first information comprises an index of the receiving matrix of the at least one user equipment; and
the second determining module is configured to determine the receiving matrix of the at least one user equipment according to at least the index.

18. The apparatus of claim 16, wherein the first information comprises a reference signal that is sent when the receiving matrix of the at least one user equipment is used as an upstream transmitting precoding matrix; and
the second determining module is configured to determine the receiving matrix of the at least one user equipment according to at least the reference signal.

19. The apparatus of claim 16, wherein the first information further comprises a resource status and/or a load status of the at least one base station associated with the at least one user equipment; and
the third determining module is configured to determine the access base station of the at least one user equipment according to at least the channel status information and the resource status and/or the load status.

20. The apparatus according to claim 16, wherein the first acquisition module is configured to receive the first information that is sent by at least one of the at least one base station associated with the at least one user equipment.

21. The apparatus of claim 16, wherein the apparatus further comprises:
a first sending module, configured to send second information associated with the first transmitting precoding matrix.

22. An information sending apparatus, wherein the apparatus comprises:
a receiving-matrix determining module, configured to determine a receiving matrix of a user equipment;
a sending module, configured to send first information associated with the receiving matrix of the user equipment, wherein the receiving matrix is used to determine a first transmitting precoding matrix of at least one interfering base station which causes interference with the user equipment to cause an interfering signal sent by the interfering base station to fall beyond a subspace of the receiving matrix of the at least one user equipment; and
an acquisition module configured to acquire a second transmitting precoding matrix of the at least one base station associated with the user equipment, wherein
the receiving-matrix determining module is configured to determine the receiving matrix of the user equipment according to at least the access base station of the user equipment, the channel status related information, and the second transmitting precoding matrix of the at least one base station associated with the user equipment.

23. The apparatus of claim 22, wherein
the acquisition module is configured to acquire information related to a status of a channel between the user equipment and the at least one associated base station.

24. The apparatus of claim 23, wherein the apparatus further comprises:
an access-base-station determining module, configured to determine the access base station of the user equipment according to at least the channel status related information.

25. The apparatus of claim 24, wherein the acquisition module is further configured to acquire a resource status and/or a load status of the at least one base station associated with the user equipment; and
the access-base-station determining module is configured to determine the access base station of the user equipment according to at least the channel status related information and the resource status and/or the load status.

26. A precoding apparatus, wherein the apparatus comprises:
a memory, configured to store instructions; and
a processor, configured to execute the instructions stored in the memory, wherein the instructions cause the processor to execute the following steps:
acquiring first information associated with a receiving matrix of at least one user equipment that is interfered by an interfering base station;
determining a first transmitting precoding matrix of the interfering base station according to at least the receiving matrix of the at least one user equipment to cause an interfering signal sent by the interfering base station to fall beyond a subspace of the receiving matrix of the at least one user equipment, wherein the first information comprises channel status related information between the at least one user equipment and at least one associated base station, and a second transmitting precoding matrix of the at least one base station associated with the at least one user equipment; and
determining the receiving matrix of the at least one user equipment according to at least one access base station of the at least one user equipment, the channel status related information, and the second transmitting precoding matrix of the at least one base station associated with the at least one user equipment.

27. An information sending apparatus, wherein the apparatus comprises:
a memory, configured to store instructions; and
a processor, configured to execute the instructions stored in the memory, wherein the instructions cause the processor to execute the following steps:
determining a receiving matrix of a user equipment;
sending first information associated with the receiving matrix of the user equipment, wherein the receiving matrix is used to determine a first transmitting precoding matrix of at least one interfering base station which causes interference with the user equipment to cause an interfering signal sent by the interfering base station to fall beyond a subspace of the receiving matrix of the at least one user equipment; and
acquiring a second transmitting precoding matrix of the at least one base station associated with the user equipment, wherein the determining a receiving matrix of a user equipment comprises:
determining the receiving matrix of the user equipment according to at least the access base station of the user equipment, the channel status related information, and the second transmitting precoding matrix of the at least one base station associated with the user equipment.

* * * * *